(12) United States Patent
Smith et al.

(10) Patent No.: US 7,213,745 B2
(45) Date of Patent: May 8, 2007

(54) FINANCIAL TRANSACTIONS PROCESSING SYSTEM INCLUDING CUSTOMER DISPLAY SCREEN

(75) Inventors: John W. Smith, Woodridge, IL (US);
Philip Michael William Ireland, Rowlands Castle (GB)

(73) Assignee: De la Rue International Limited, Hampshire (GB)

( * ) Notice: Subject to any disclaimer, the term of this patent is extended or adjusted under 35 U.S.C. 154(b) by 0 days.

(21) Appl. No.: 11/157,800

(22) Filed: Jun. 22, 2005

(65) Prior Publication Data

US 2006/0289629 A1 Dec. 28, 2006

(51) Int. Cl.
*G06Q 40/00* (2006.01)

(52) U.S. Cl. ......................................... 235/379; 705/35
(58) Field of Classification Search ................ 235/379; 705/35, 43–45
See application file for complete search history.

(56) References Cited

U.S. PATENT DOCUMENTS

| | | | |
|---|---|---|---|
| 4,580,040 A * | 4/1986 | Granzow et al. ........... 235/379 |
| 4,782,328 A | 11/1988 | Denlinger |
| 4,806,709 A | 2/1989 | Evans |
| 4,811,004 A | 3/1989 | Person et al. |
| 4,851,616 A | 7/1989 | Wales et al. |
| 4,928,094 A | 5/1990 | Smith |
| 4,931,782 A | 6/1990 | Jackson |
| 5,105,186 A | 4/1992 | May |
| 5,184,115 A | 2/1993 | Black et al. |
| 5,198,976 A | 3/1993 | Form et al. |
| 5,231,381 A | 7/1993 | Duwaer |
| 5,267,149 A * | 11/1993 | Anada et al. .................. 705/44 |
| 5,297,030 A | 3/1994 | Vassigh et al. |
| 5,317,140 A | 5/1994 | Dunthorn |
| 5,604,341 A * | 2/1997 | Grossi et al. ............... 235/379 |
| 6,373,209 B1 | 4/2002 | Gerber et al. |
| 6,557,849 B2 | 5/2003 | Wyss |
| 6,665,431 B2 | 12/2003 | Jones et al. |
| 6,681,985 B1 * | 1/2004 | Curtin et al. ............... 235/379 |
| 6,715,735 B2 | 4/2004 | Bligh et al. |
| 2003/0179290 A1* | 9/2003 | Frazzitta et al. .............. 348/61 |
| 2003/0212904 A1* | 11/2003 | Randle et al. .............. 713/200 |
| 2006/0004660 A1* | 1/2006 | Pranger ....................... 705/43 |

FOREIGN PATENT DOCUMENTS

WO  WO 03/075228 A1  9/2003
WO  WO 2004/066620 A1  8/2004

OTHER PUBLICATIONS

De La Rue Cash Systems; "Benchmark Series® 7: Teller Cash Dispensing System" brochure; Copyright © 2003 De La Rue Cash Systems, Inc.
De La Rue Cash Systems GMBH amd Plan Object GMBH; "Dialog Banking in der Praxis", Mörfelden- Walldorf; Feb. 1999.

* cited by examiner

*Primary Examiner*—Jared J. Fureman
*Assistant Examiner*—Kristy A. Haupt
(74) *Attorney, Agent, or Firm*—Oliff & Berridge, PLC

(57) ABSTRACT

A financial transactions processing system includes a teller display screen and a customer display screen, both of which can be coupled to a teller computer. The teller computer can be operably connected to a bank computer. The teller computer provides the teller display screen with a first set of information to be displayed on the teller display screen, and supplies the customer display screen with a second set of information to be displayed on the customer display screen, such that the customer display screen and the teller display screen display different sets of information.

20 Claims, 9 Drawing Sheets

```
Account No.: AAABBB
Name:     DOE, JOHN
Balance:  $ 10,500.00
Transaction Request:
    Withdraw  $ 250.00
```
— 120

```
Account No.: AAABBB
Name:    DOE, JOHN
S.S. No:  XXX-YY-ZZZZ
Balance:  $ 10,500.00
Pending Transaction(s):
    Deposited check - not yet cleared
          $ 5,000.00
Current Transaction: Withdraw $250.00
Alerts: None
```
— 110

| Update Personal Information | | | | Request a Teller |

HOW CAN WE HELP YOU TODAY?

PLEASE ENTER YOUR PIN *****
&
THEN TOUCH SERVICE REQUIRED

| Request insurance quote | | | | Request loan data |

| Order Statement | Deposit Cash | Dispense Cash | Request Balance |

FIG. 11

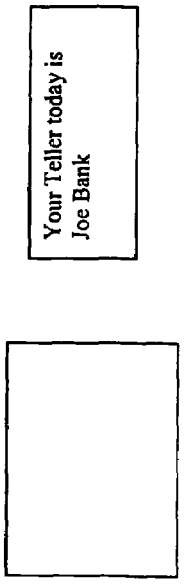

FINANCIAL TRANSACTIONS PROCESSING SYSTEM INCLUDING CUSTOMER DISPLAY SCREEN

BACKGROUND

The invention relates to financial transactions processing systems which can be provided, for example, in banks and other banking environments.

A typical bank branch office includes a teller counter having one or more teller stations. The teller counter typically separates the branch office into a teller area on one side of the counter, and a customer area on the other side of the counter. In some banks, an additional transparent (possibly bullet-proof) partition is located above the counter to further separate the teller area from the customer area. Each teller station typically includes a teller display monitor that faces the teller, and thus can be viewed only by the teller. When a customer makes a transaction with a teller at one of the teller stations, the teller enters the customer information (for example, the customer's account number) into a teller computer which communicates with a bank computer, and then information about the customer's account can be displayed to the teller over the teller display monitor.

Because the teller display faces the teller, and the teller and customer are separated by the teller counter (possibly including the additional transparent partition), the customer cannot view the information on the teller display. The inability of the customer to view the teller display can be inconvenient, for example, when the teller seeks to confirm the correctness of the information on the display, or when the customer desires access to the information on the display, for example, the account balance in the customer's account. To provide the customer with the customer's account balance, the teller typically must write this information on a slip of paper that is then given to the customer.

A more recent trend in the banking industry is to provide stand-alone podiums (sometimes called towers) containing one or two teller stations around which tellers and customers can move. Examples of such stand-alone podiums/towers are provided in, for example, U.S. Pat. No. 6,681,985, the disclosure of which is incorporated herein by reference in its entirety. Also see De La Rue Cash Systems GMBH and Plan Object GMBH, "Dialog Banking in der Praxis", Mörfelden-Walldorf, February, 1999. These stand-alone podiums also, however, include a display only for the teller (podiums/towers with two teller stations include a teller display for each of the tellers). If the teller display is built into the podium, then the customer needs to move to the teller's side of the podium in order to view the display. If the display rests on top of the podium, then the teller may be able to move the display so that the customer can view the display, or again, the customer can move to the teller's side. However, either of these procedures is inconvenient. In addition, because the teller's display screen sometimes includes information that is not intended for viewing by the customer (for example, alerts regarding the customer or the customer's account), the teller may not want the customer to view the teller's display. However, in such a situation, it may be difficult for the teller to prevent the customer from viewing the teller's display in the stand-alone podium/tower environment.

As society in general becomes more and more accustomed to being involved in banking transactions (for example, due to the use of automated teller machines and Internet banking), many customers prefer to have access to the information that presently is displayed to the teller. In addition, providing a display for the customer may tend to keep the customer occupied so that the transaction seems to take less time.

De La Rue Cash Systems offers a "data display", which is a small unit containing a one or two line display that can be viewed by the customer at a teller counter. These displays, however, provide the following three messages: (1) WELCOME, when no activity is taking place; (2) PROCESSING YOUR TRANSACTION, when a teller requests a transaction for the customer; and (3) CASH BACK $xxx, when cash is dispensed to the customer.

SUMMARY

A financial transactions processing system according to some aspects of the invention, includes a teller display screen and a customer display screen, both of which can be coupled to a teller computer. The teller computer can be coupled to a bank computer. The teller computer provides the teller display screen with a first set of information to be displayed on the teller display screen, and supplies the customer display screen with a second set of information to be displayed on the customer display screen. The first set of information is different from the second set of information. For example, the first and second sets of information can be different in at least one of content and format. The second set of information can be a subset of the information that is contained in the first set.

According to some embodiments, the customer display screen displays less information than the teller display screen.

According to some embodiments, the information provided to the customer display screen by the teller computer includes information regarding a transaction currently requested by the customer. For example, the information can include a deposit amount or a withdrawal amount requested by the customer. This increases the customer's confidence that the transaction is being processed correctly.

According to some embodiments, the information provided to the customer display screen by the teller computer can include information regarding an account of the customer, for example, the account balance. This information always is of interest to the customer, and now can be provided without requiring any further effort by the teller. Thus, the teller's productivity can be increased.

According to some embodiments, the teller computer sends alerts about the customer or the customer's account to the teller display screen, but does not send such alerts to the customer display screen. One example of such an alert is that a desired transaction (e.g., a cash withdrawal) is not authorized (e.g., due to insufficient funds in the customer's account). Because the customer has its own display screen, there is a much lower possibility that the customer will seek to view the teller's display screen. Moreover, the customer display screen can be controlled to display the customer's account balance, without the alert, so that the customer receives the information needed to resolve this issue without viewing internal bank messages.

The teller and customer display screens can be provided on a common housing and face in different directions. Alternatively, the teller and customer display screens can be provided on separate housings. According to some embodiments, the teller and customer display screens face in opposite directions.

The financial transaction processing system according to embodiments of the invention can be provided at an in-line teller counter or at a stand-alone podium, for example. The in-line teller counter and the stand-alone podium can include a cash-dispensing machine such as, for example, a teller cash dispenser (which includes a store of cash which can be dispensed to either the teller or directly to the customer) or a teller cash recycler (which is capable of receiving currency (e.g., during a deposit transaction) and then, after confirming the authenticity of that currency, dispensing that currency (e.g., during a withdrawal transaction) to the teller or directly to the customer).

According to some embodiments, the teller display screen is larger in area than the customer display screen. This reduces overall cost, while providing space for the display of additional information to the teller. The customer display screen can include a touch screen so that it can function as a user interface.

In addition, according to some embodiments, the teller computer provides the customer display screen with promotional information, along with information regarding the customer's transaction. Furthermore, when no transaction is taking place, it is possible for the teller computer to provide the customer display screen with promotional information.

According to some embodiments, the customer display screen has a restricted viewing angle which can be provided, for example, by a privacy filter, so that it is difficult for bystanders to view a customer's information that is displayed on the customer display screen.

BRIEF DESCRIPTION OF THE DRAWINGS

Various embodiments of the invention will be described in detail with reference to the following drawings in which like reference numerals are used to identify like elements, and wherein:

FIG. 2 shows a customer display screen according to one example;

FIG. 3 shows a teller display screen according to one example;

FIG. 11 shows a possible touch screen display that could be presented on a customer display screen; and FIG. 12 shows another possible touch screen display for a customer display screen.

DETAILED DESCRIPTION OF EXEMPLARY EMBODIMENTS

Exemplary embodiments will be described with reference to the accompanying drawings. These embodiments, however, are exemplary only, and are not intended to limit the invention.

Figure 1:
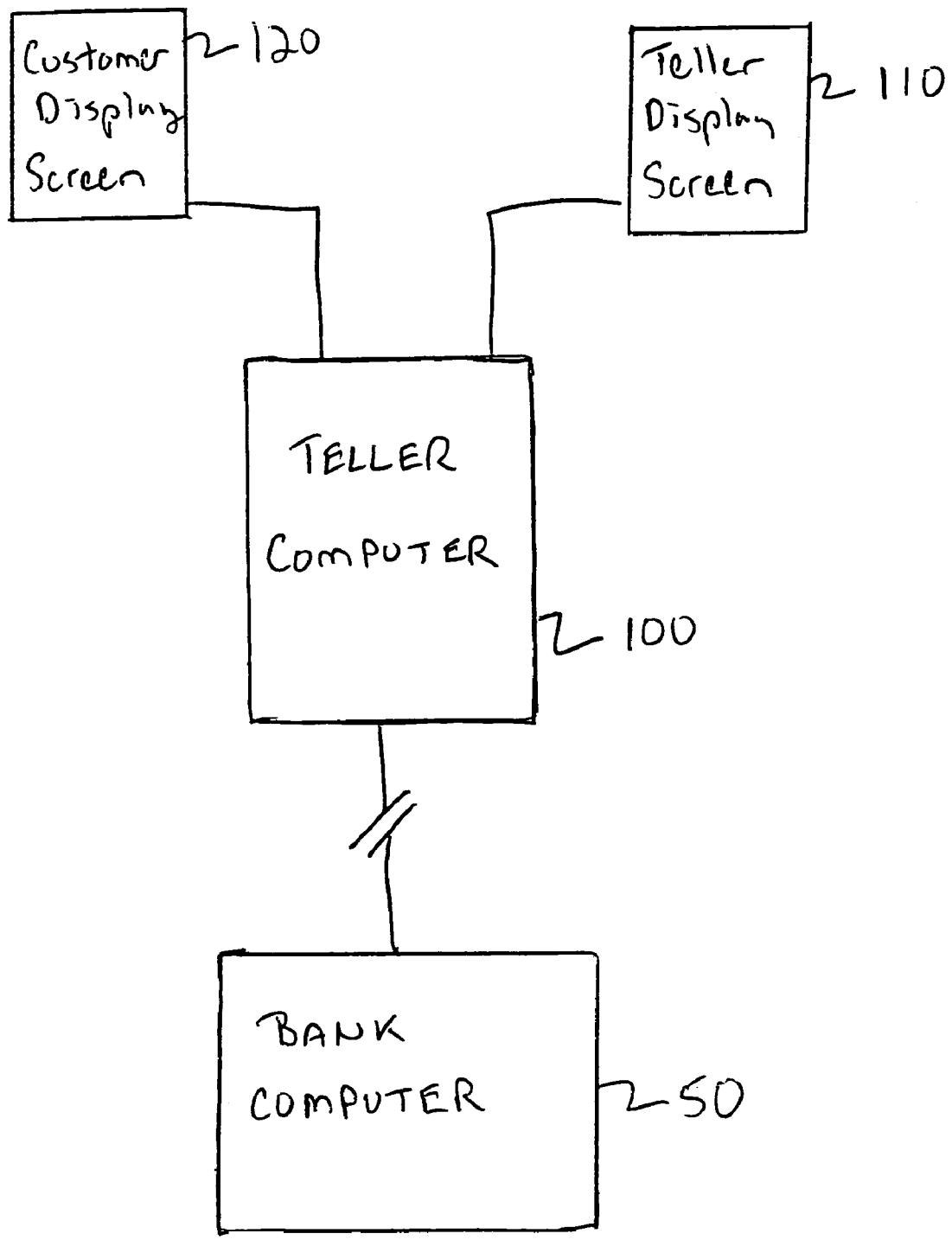
FIG. 1 is a block diagram of a financial transactions processing system according to an embodiment of the invention.

As shown in FIG. 1, a teller station includes a teller computer 100 that can be linked to a bank computer 50 over a communications system such as an intranet or the internet. The teller computer 100 can be, for example, a personal computer running appropriate banking software. One example of appropriate banking software is Teller Cash Connect, available from De La Rue Cash Systems of Lisle, Ill.

Each teller station also includes a teller display screen 110 and a customer display screen 120. The teller display screen 110 and the customer display screen 120 can be provided on separate housings (for example, they can be separate flat panel display monitors) as shown, for example, in FIGS. 5, 6A and 8–10, or they can be provided on a common housing 140 to result in a double-sided monitor as shown, for example, in FIGS. 4A–4B and 6B. In general, it is preferable to provide separate housings for each of the teller and customer display screens, because that option is more flexible, cheaper, and would not require replacement of both displays if one of the displays requires repair and/or replacement. However, the double-sided monitor may be more desirable in certain applications.

For example, the use of flat screen technology enables a straightforward implementation of a back-to-back double sided monitor display requiring a single mounting pillar, which also can conceal (i.e., house) the power and connecting (data) cables, to provide an aesthetically pleasing result, taking up very little desk-top space. The use of two displays (separate or integrated) enables the teller and customer to remain facing each other, and therefore maintain eye contact in conjunction with using the screens, rather than when sharing a single screen, which requires the teller and customer to be positioned side-by-side and having to turn to make eye contact. The double-sided monitor further facilitates the teller and customer facing each other. In addition, a double-sided monitor by its design can only be viewed one screen at a time (by a single person), and therefore confidentiality of information can be maintained from the teller screen to the customer screen, and vice versa.

Typically, the size (area) of the teller display screen will be larger than the size (area) of the customer display screen. For example, the teller display screen can be a 19 inch monitor, whereas the customer display screen can be a 15 inch monitor. In general, the teller and customer monitors are in the range of 15–19 inches.

In addition, according to some embodiments, the customer display screen includes a touch panel (the display screen and touch panel collectively forming a touch screen) so that the customer display screen can function as a user interface. As is known, the touch panel typically includes a two-dimensional matrix of optically transparent switches. Examples of touch screens are provided in U.S. Pat. Nos. 6,665,431, 5,317,140, 5,297,030, 5,231,381, 5,198,976, 5,184,115, 5,105,186, 4,931,782, 4,928,094, 4,851,616, 4,811,004, 4,806,709 and 4,782,328, the disclosures of which are incorporated herein by reference in their entireties. For example, the following information can be requested from and entered by a customer when the customer display screen is a touch screen: PIN numbers or other security data to establish identity of customer to teller;

request for cash amount to be dispensed or deposited; changes of personal information such as address, phone number, etc.; request for loan quotes or insurance information; balance or statement print requests; requests for help or for a particular teller. FIG. 11 shows a possible touch screen display that could be presented on a customer display screen. The customer touch screen could function like the touch screen provided with some ATMs.

Of course, it also is possible for the teller display screen to include a touch screen, although that is not typically done in the banking environment. The teller typically has a standard keyboard and a mouse to allow full flexibility of data input and/or machine interaction.

FIG. 2 shows an example of the information that can be provided over a customer display screen 120. As shown in FIG. 2, the customer display screen 120 provides the customer's account number and the customer's name. In addition, the transaction request (in the FIG. 2 example, a withdrawal of $250) also can be displayed. This information provides the customer with confidence that the transaction is being processed correctly. In addition, it is possible to display the account balance on the customer display screen 120. This avoids the need for the teller to write this information down on a piece of paper that is then provided to the customer, as typically is done in the banking environment. Other data could be overlaid or accessed from the screen, for example, comparison of Personal Account Cash Flow with Credit Card Cash Flow over some period such as the preceding three months. Alternatively, modeling of reduction in mortgage term outstanding based on various increased payments or lump sum injection could be displayed on the customer display. FIG. 12 shows another possible customer display.

It is preferable that the customer display screen 120 have a limited viewing angle so that other customers in the area cannot readily view the information provided on the customer display screen. The limited viewing angle can be provided, for example, by including a privacy filter, which restricts the viewing angle of the display screen, over the display screen. The provision of such a privacy filter is typically done in the ATM environment. One example is described in WO 2004/066620, the disclosure of which is incorporated herein by reference in its entirety.

FIG. 3 shows an example of a teller display screen 110 that could be displayed to the teller when the customer receives the display shown in FIG. 2. In addition to the information provided on the FIG. 2 customer display screen, the FIG. 3 teller display screen also includes the customer's social security number and identifies any transactions that have not yet cleared as "pending transactions." For example, the FIG. 3 display screen indicates that a check for $5,000 has been deposited, but has not yet cleared.

The FIG. 3 teller display screen also is capable of displaying alerts. In the FIG. 3 example, there are no alerts. However, under certain circumstances, the teller may receive alerts. For example, if a customer seeks to withdraw more than a predetermined (i.e., authorized) amount, the teller may receive an alert, for example, that the bank manager must approve the withdrawal. In addition, if a customer seeks to withdraw more than the customer has available in that account, the teller would receive an alert. This alert information is not provided to the customer according to preferred embodiments of the invention. However, because the customer display screen displays the account balance, it provides the customer with information that may help the customer to understand why the withdrawal cannot be accomplished, without requiring the teller to perform any additional action to provide the customer with this information. Therefore, the issue may be resolved more quickly.

Other possible alerts, which may be given only to the teller, only to the customer, or to both the teller and customer, include: current credit card outstanding balances and card repayment information, which may start a discussion on a personal loan at a reduced interest rate; renewal of insurance on building or other property is due, providing the opportunity to sell insurance services; highlighting of money held in the current account above the amount required to meet normal monthly expenses, which may be put to better use/level of return in some form of investment account. Alerts also could be provided relating to family members, for example, reaching college age, and therefore offering account facilities for them as new customers.

According to some embodiments, the customer display screen can be provided with promotional information (for example, from the teller computer) that is displayed to the customer. The promotional material can be, for example, loan rates compared to other banks, insurance products, second home mortgages, credit card offers, and how to recognize a counterfeit note. Other screens can be run including the bank's corporate video emphasizing trust, security, etc. The promotional information can be displayed along with the customer's transaction information during a transaction. In addition, or as an alternative, the promotional information can be displayed on the customer display screen when the teller station is not being used by any customer.

Various banking arrangements that can implement dual screen embodiments will now be described.

Figure 5:
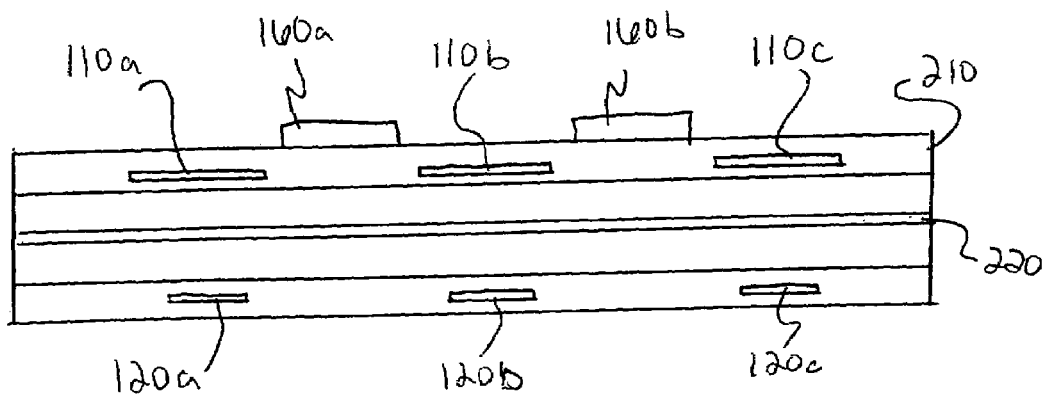
FIG. 5 is a top view of an in-line teller counter including a plurality of teller stations.
Figure 10:
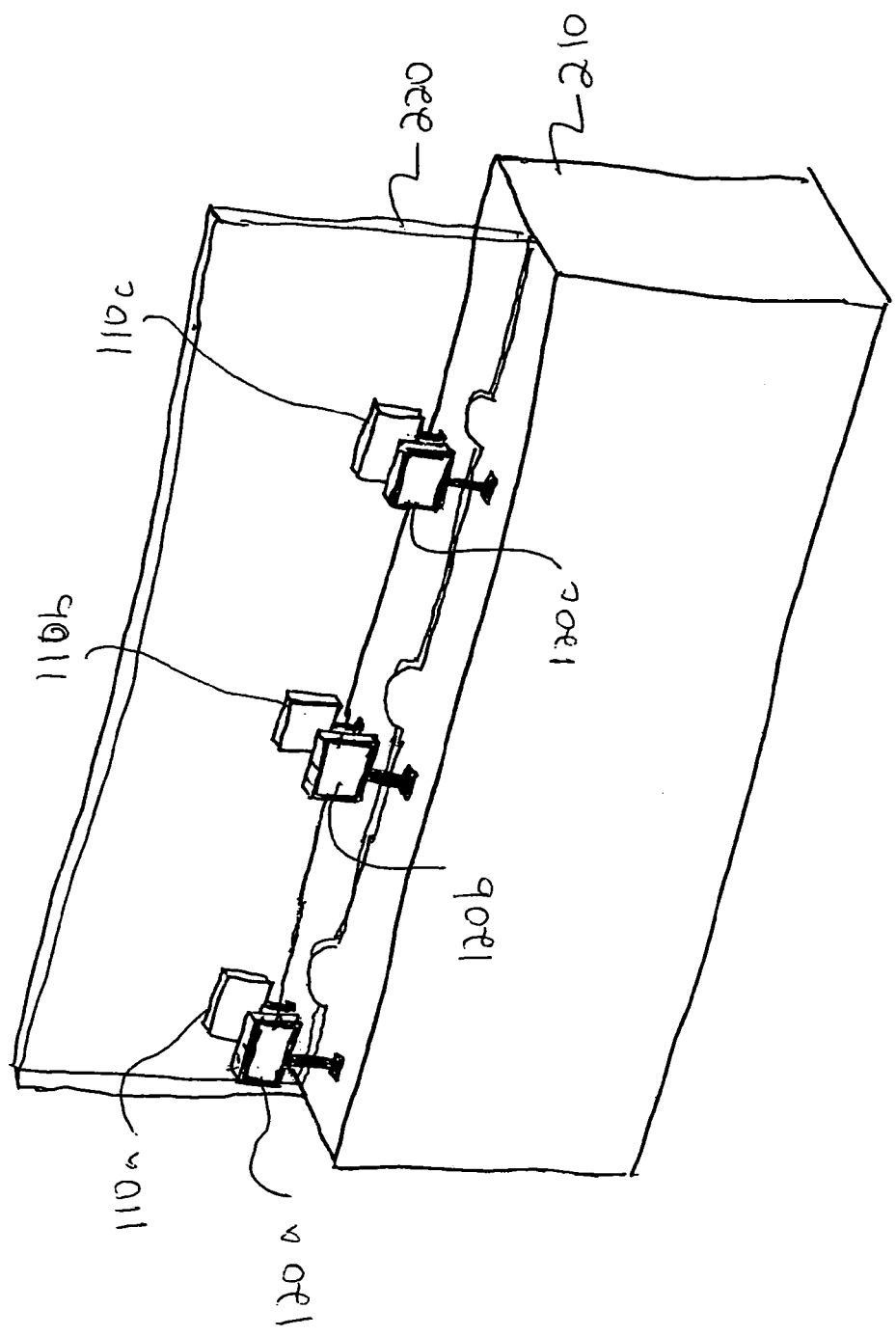
FIG. 10 is a perspective view of an in-line teller counter containing a partition and three teller stations.

An in-line teller counter in which an embodiment of the invention is implemented will first be described in connection with FIGS. 5 and 10. FIG. 5 is a top view of an in-line teller counter having three teller stations. FIG. 10 is a perspective view of the FIG. 5 in-line teller counter.

As is common in many standard banks, an in-line teller counter 210 is provided, and separates the bank area into a teller area and a customer area. Many such teller counters include a partition 220, which can be made of bullet-proof glass, to further separate the teller area from the customer area.

The in-line teller counter of FIGS. 5 and 10 includes three teller stations. Each teller station includes a teller display 110a, 110b and 110c, respectively. These tellers displays are commonly provided in the banking environment, and each is coupled to its own teller computer (not shown in FIGS. 5 and 10) which, in turn, is coupled to a bank computer (also not shown in FIGS. 5 and 10).

The in-line teller counter also includes one or more teller cash dispensing machines. In the FIG. 5 embodiment, two such teller cash dispensers 160a and 160b are provided in the teller counter. For example, teller cash dispenser (TCD) 160a can be shared by the tellers using the first and second teller stations (associated with teller displays 110a and 110b, respectively). The teller cash dispenser is a machine that includes a plurality of bill storage cartridges which dispense currency bills to the teller based upon input signals provided by the teller through the teller's computer. One example of a teller cash dispenser is the TCD 2000, Model 50, Model 30, etc. or the Benchmark Series® 7 teller cash dispensing system, all provided by De La Rue Cash Systems of Lisle, Ill. A TCD does not have the capability of counting money that is deposited, but may include a secure drop box into which bundles of cash, for example (perhaps placed in a marked envelope), can be inserted.

As an alternative to a TCD, a teller cash recycler (TCR) can be provided. A TCR is similar to a TCD, except that the TCR also has an input bin into which a stack of currency bills can be placed, and hardware and software for feeding the bills from that input bin, scanning the bills to determine their denomination and/or authenticity (by using, for example, one or more of optical, magnetic and UV sensing techniques well known in the art) and then feeding denominated and/or authenticated notes to the currency storage cartridges. The notes then can be re-dispensed from the currency storage cartridges. Thus, when a TCR is provided, the currency bill storage cartridges must be capable of receiving bills and then re-dispensing such bills. For a TCR, the currency bill storage cartridges typically are roll storage modules (RSM), whereas a TCD, which only needs to dispense currency bills, can use other types of bill storage cartridges, for example, which store the bills in a stack. Some examples are shown in, for example: U.S. Pat. No. 6,373,209, U.S. Pat. No. 6,715,735, U.S. Pat. No. 6,557,849 and WO 03/075228.

Figure 4A:
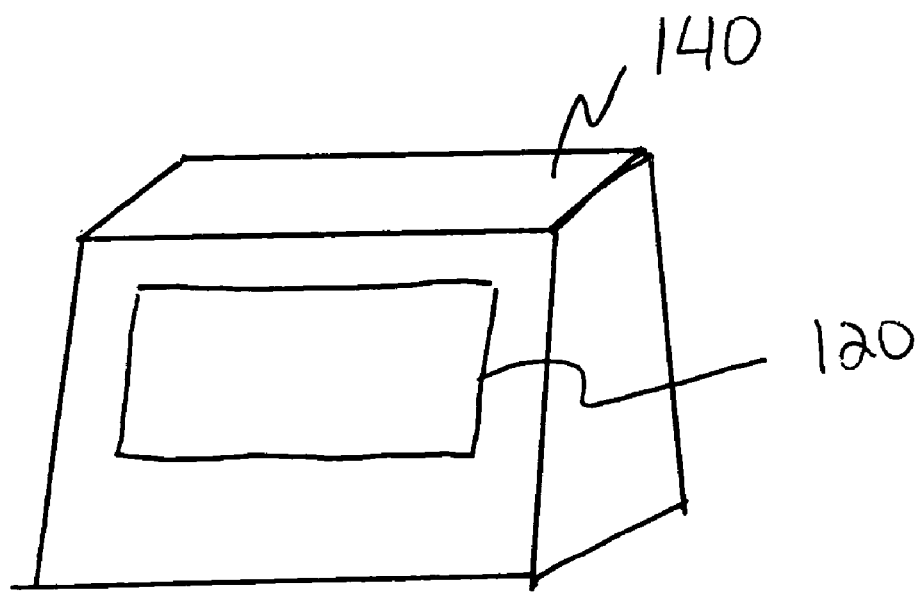
FIG. 4A shows the customer display screen on a single housing that includes both the customer and teller display screens.
Figure 4B:
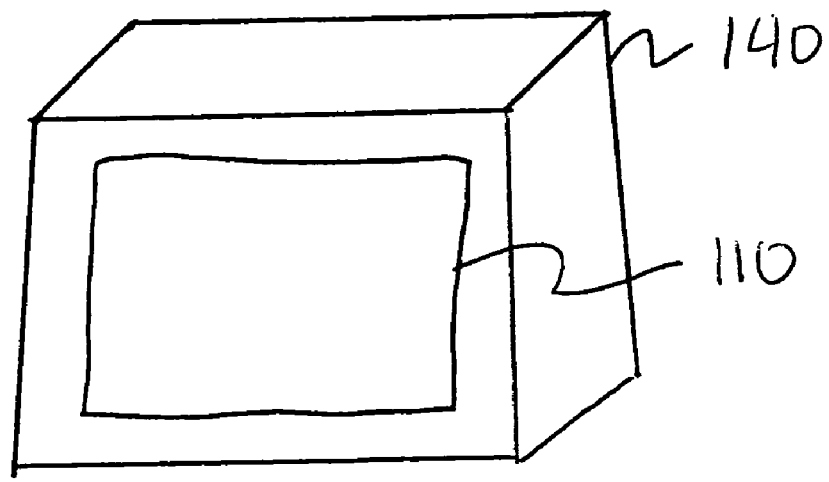
FIG. 4B shows the teller display screen side of the housing of FIG. 4A.

Referring back to FIGS. 5 and 10, each teller station also includes a corresponding customer display 120a, 120b and 120c. These displays can have all of the features described above with respect to FIGS. 1 and 2. In FIGS. 5 and 10, each teller station includes separate teller and customer displays. However, it also is possible to include a single housing containing both a teller and customer display (as shown in FIGS. 4A–4B) at each teller station.

Figures 6A, 6B:
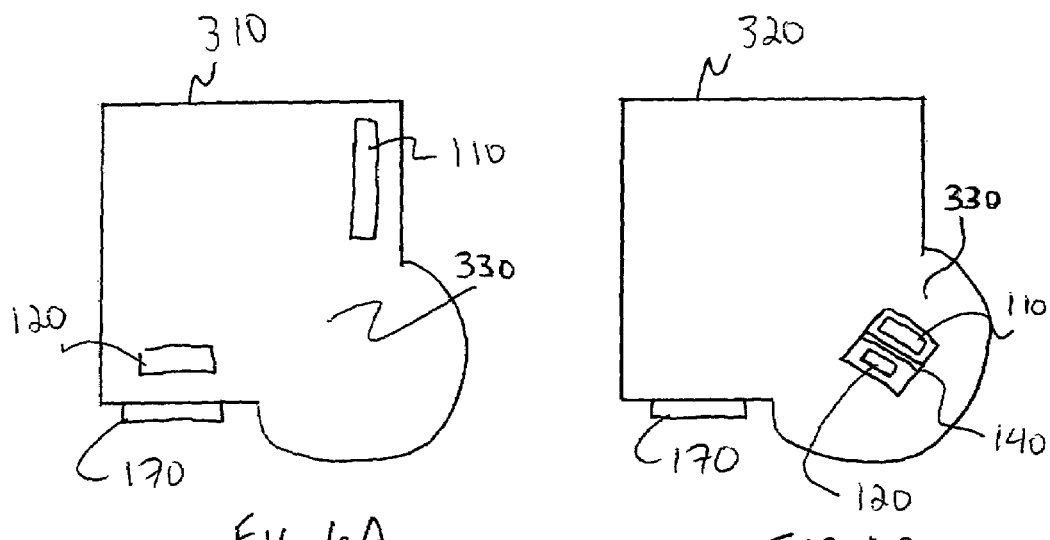
FIG. 6A shows a stand-alone podium with separate teller and customer display screens.
FIG. 6B shows a stand-alone podium with a single housing containing the teller and customer display screens.

FIG. 6A illustrates one exemplary embodiment of a stand-alone podium 310 around which both the teller and the customer can move. Such stand-alone podiums are known in the art, and have been offered by De La Rue Cash Systems for a number of years. Some examples of banking arrangements including such stand-alone podiums can be seen, for example, in U.S. Pat. No. 6,681,985, the disclosure of which is incorporated herein by reference in its entirety.

The stand-alone podium 310 of FIG. 6A includes an upper surface 330 on which a teller display 110 and a customer display 120 are provided. The stand-alone podium 310 of FIG. 6A also includes a TCD 170 that will dispense cash directly to the customer. As an alternative, the TCD could be arranged so as to dispense cash directly to the teller (like the arrangement shown in FIG. 5), who would then pass that cash to the customer. The TCD alternatively could be a TCR, which also receives, counts and sorts currency bills, as discussed above.

FIG. 6B shows a second stand-alone podium 320, which is similar to the embodiment of FIG. 6A, except that it includes a single housing 140 on which the teller display 110 and the customer display 120 are provided. The teller display 110 and the customer display 120 of FIGS. 6A and 6B can have all of the features/characteristics described above with respect to FIGS. 1–3.

Figure 7:
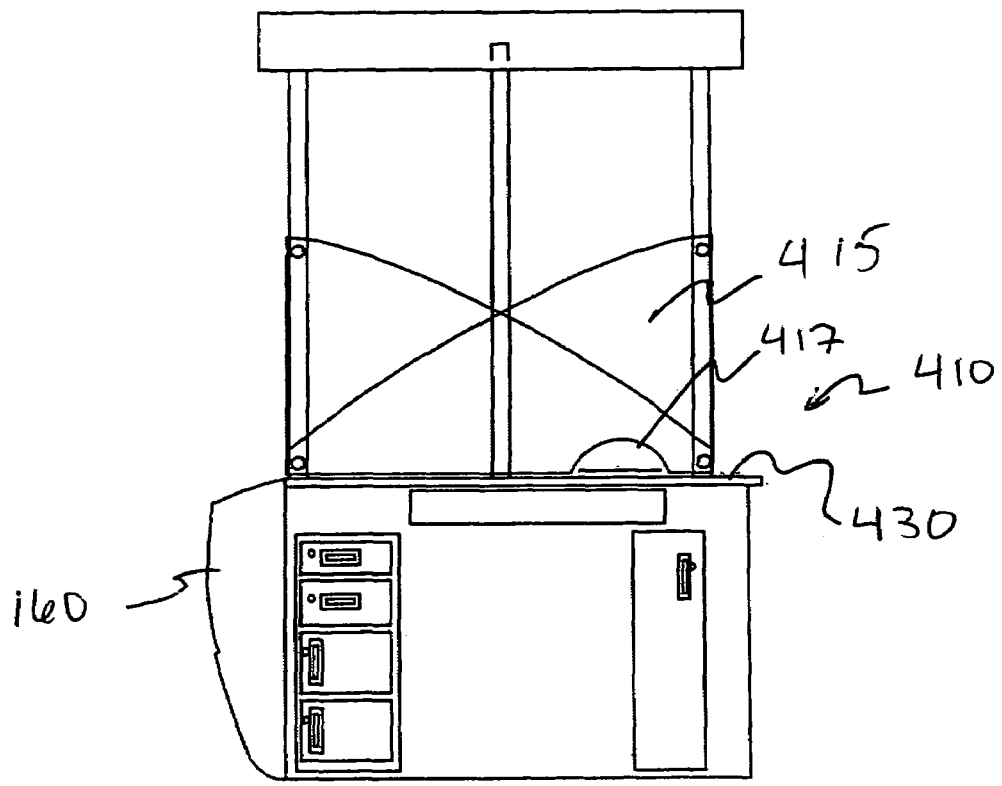
FIG. 7 is a side view of a stand-alone podium/tower containing two teller stations, but without the display screens being illustrated.
Figure 8:
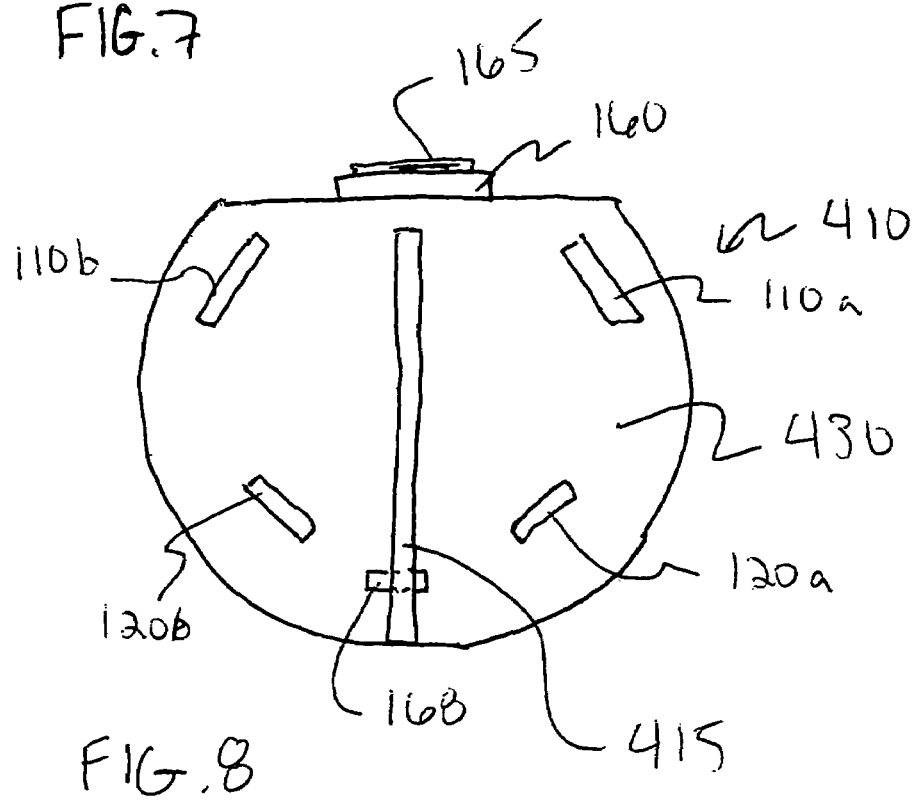
FIG. 8 is a top view of the FIG. 7 stand-alone podium with two teller display screens and two customer display screens.
Figure 9:
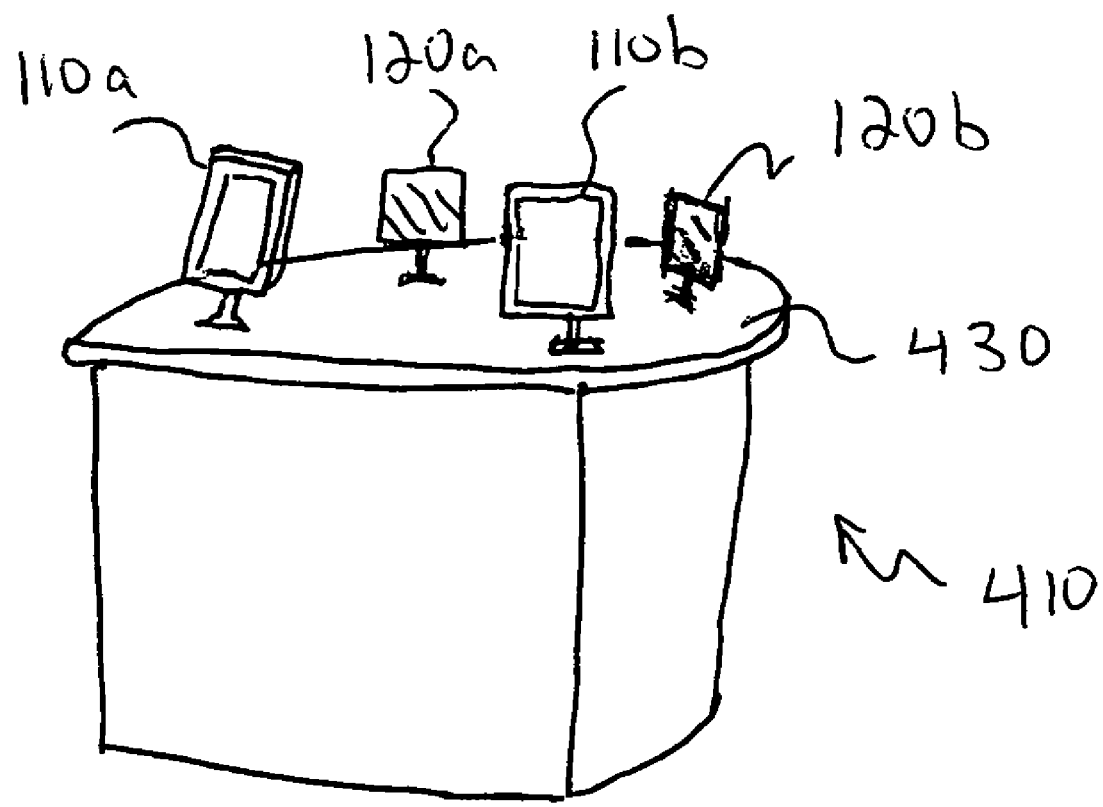
FIG. 9 is a perspective view of the FIG. 8 stand-alone podium/tower without the partition.

FIGS. 7–9 show another stand alone podium 410 having two teller stations. FIG. 7 is a side view of the podium 410, without the teller and customer displays being shown. FIG. 8 is a top view of the podium 410. FIG. 9 is a perspective view of the podium 410 without the partition shown.

As shown in FIGS. 7–9, the podium 410 includes an upper surface 430 that is divided into two sections by a partition 145 so as to form two teller stations. This two teller station type of stand-alone podium has been found to be very efficient and easy to incorporate into bank floorplans. The first teller station includes a first teller display 110a and a first customer display 120a provided on one side of the partition 415. The second teller station includes a second teller display 110b and a second customer display 120b provided on the other side of the partition 415. The orientation of the various displays 110a–120b can differ from the orientation shown in the figures. For example, the corresponding teller and customer displays can face in opposite directions (180° different from each other) instead of the orientations shown in the figures. The two teller station stand-alone podium 410 includes a TCD 160 that is shared by both of the tellers. The TCD 160 of podium 410 dispenses cash directly to the customers via output slot 168 which is provided below an opening 417 that is provided in the partition 415. The TCD 160 also includes a cash drop box 165 into which the teller can place a bundle (for example, an envelope) associated with a deposit.

Providing a display for the customer may tend to keep the customer occupied so that the transaction seems to take less time. The use of the display for communicating monetary amounts avoids any ambiguity that can occur when communicating orally, whilst also being faster; it also is language independent.

Using the display to transfer (communicate) information can be more private than having to speak, particularly in a noisy environment where eavesdropping may occur.

The display brings customers closer to the teller because it reduces the delay of the teller digesting the data and then communicating it orally. This reduces the waiting time such that the teller and customer are on an equal footing in communicating and making decisions on common information. For the customer, this should reduce the implication of secrecy associated with the teller screen, and concern that the teller is filtering information incorrectly, or not providing the whole story.

While the invention has been described with reference to preferred embodiments thereof, it is to be understood that the invention is not limited to the preferred equivalent or constructions. The invention is intended to cover various modifications and equivalent arrangements. In addition, while the various elements of the preferred embodiments are shown in various combinations and configurations, which are exemplary, other combinations and configurations, including more, less or only a single element, also are within the spirit and scope of the invention.

What is claimed is:

1. A financial transactions processing system comprising:
    a teller computer that is operably connectable to a bank computer;
    a teller display screen coupled to the teller computer; and
    a customer display screen coupled to the teller computer;
    the teller computer provides the teller display screen with a set of information to be displayed on the teller display screen, and supplies the customer display screen with a subset of the set of information to be displayed on the customer display screen, such that the customer display screen and the teller display screen display different amounts of information;
    wherein the teller display screen and the customer display screen are provided at a stand-alone podium around which the teller and the customer can walk.

2. The system of claim 1, wherein the customer display screen displays less information than the teller display screen based on the information provided by the teller computer.

3. The system of claim 1, wherein the subset of information provided to the customer display screen by the teller computer includes information regarding a transaction currently requested by the customer.

4. The system of claim 3, wherein the information regarding the transaction currently requested by the customer includes a deposit amount.

5. The system of claim 3, wherein the information regarding the transaction currently requested by the customer includes a withdrawal amount.

6. The system of claim 1, wherein the subset of information provided to the customer display screen by the teller computer includes information regarding an account of the customer.

7. The system of claim 6, wherein the information regarding the account of the customer includes an account balance.

8. The system of claim 1, wherein the teller computer does not send alerts about the customer or an account of the customer to the customer display screen, but sends the alerts to the teller display screen.

9. The system of claim 1, wherein the teller display screen and the customer display screen are provided on a common housing and face in different directions.

10. The system of claim 9, wherein the teller display screen and the customer display screen face in opposite directions.

11. The system of claim 1, wherein the teller display screen and the customer display screen are provided on a separate housings that face in different directions.

12. The system of claim 11, wherein the separate housings are arranged so that the teller display screen and the customer display screen face in opposite directions.

13. The system of claim 1, wherein the stand-alone podium includes at least a cash-dispensing machine.

14. The system of claim 13, further comprising a second teller computer, a second teller display screen and a second customer display screen at the stand-alone podium.

15. The system of claim 1, wherein at least the customer display screen includes a touch screen so that the customer display screen can function as a user interface.

16. The system of claim 1, wherein the teller display screen is larger in area than the customer display screen.

17. The system of claim 1, wherein during a transaction involving the customer, the teller computer provides the customer display screen with promotional information, along with information regarding the transaction.

18. The system of claim 1, wherein the teller computer provides the customer display screen with promotional information when the customer display screen is not being used by a customer.

19. The system of claim 1, wherein the customer display screen has a restricted viewing angle.

20. A financial transactions processing system comprising:
a teller computer that is operably connectable to a bank computer;
a teller display screen coupled to the teller computer; and
a customer display screen coupled to the teller computer;
the teller computer provides the teller display screen with a first set of information to be displayed on the teller display screen, and supplies the customer display screen with a second set of information to be displayed on the customer display screen, the first set of information being different from the second set of information in at least one of content and format, such that the customer display screen and the teller display screen provide different displays;
wherein the teller display screen and the customer display screen are provided at a stand-alone podium around which the teller and the customer can walk.

* * * * *